(12) United States Patent
Babcock, IV

(10) Patent No.: US 9,157,586 B1
(45) Date of Patent: Oct. 13, 2015

(54) LIGHT FILTERING SYSTEM

(76) Inventor: Edward Vose Babcock, IV, Frenchtown, MT (US)

( * ) Notice: Subject to any disclaimer, the term of this patent is extended or adjusted under 35 U.S.C. 154(b) by 192 days.

(21) Appl. No.: 13/539,548

(22) Filed: Jul. 2, 2012

(51) Int. Cl.
| F21S 8/00 | (2006.01) |
| F21V 9/00 | (2015.01) |
| F21V 9/08 | (2006.01) |
| F21V 14/08 | (2006.01) |
| F21V 11/14 | (2006.01) |
| F21V 1/00 | (2006.01) |
| F21L 4/02 | (2006.01) |
| F21L 4/00 | (2006.01) |
| G02B 7/00 | (2006.01) |

(52) U.S. Cl.
CPC ............. F21L 15/04 (2013.01); F21V 9/083 (2013.01); F21L 4/005 (2013.01); F21L 4/022 (2013.01); F21L 7/00 (2013.01); F21L 15/06 (2013.01); F21V 11/14 (2013.01); F21V 14/085 (2013.01); G02B 7/006 (2013.01)

(58) Field of Classification Search
CPC .......... F21V 9/083; F21V 9/14; F21V 13/08; F21V 13/10; F21V 14/006; F21V 14/08; F21V 14/085; F21V 23/0428; F21V 11/08; F21V 11/10; F21V 11/12; F21V 11/14; F21L 15/04; F21L 15/06; F21L 4/00; F41G 1/383; G02B 23/16; G02B 7/006; F41A 35/02
USPC ........... 362/246, 277, 290, 293, 355, 356, 16, 362/18, 208, 282, 197, 17, 279, 223, 300, 362/307, 311.01, 202, 291, 292; 42/129; 359/611, 511
See application file for complete search history.

(56) References Cited

U.S. PATENT DOCUMENTS

| 3,539,798 | A | | 11/1970 | Perry | |
| 3,919,543 | A | * | 11/1975 | Noren | 362/293 |
| 4,293,892 | A | * | 10/1981 | Plummer | 362/17 |
| 5,014,171 | A | | 5/1991 | Price, III | |
| 5,233,375 | A | | 8/1993 | Williams | |
| 5,267,131 | A | * | 11/1993 | Anthony et al. | 362/208 |
| 5,319,530 | A | | 6/1994 | Kreutzer | |
| 5,432,683 | A | * | 7/1995 | Brown | 362/16 |
| 5,495,676 | A | * | 3/1996 | Chesnut et al. | 42/129 |
| 5,561,563 | A | * | 10/1996 | Chesnut et al. | 359/823 |
| 6,082,885 | A | | 7/2000 | Beifer | |
| 6,454,439 | B1 | * | 9/2002 | Camarota | 362/293 |
| 6,761,467 | B2 | * | 7/2004 | Matthews et al. | 362/202 |
| 6,799,854 | B1 | * | 10/2004 | Steiner | 359/611 |
| 6,883,946 | B1 | * | 4/2005 | Kolar | 362/510 |
| 7,004,600 | B2 | * | 2/2006 | Echterling | 362/187 |
| 7,128,436 | B2 | * | 10/2006 | Bensinger et al. | 362/186 |
| 7,172,312 | B2 | * | 2/2007 | Chen | 362/202 |

(Continued)

FOREIGN PATENT DOCUMENTS

ZA    WO2012058699 A2 *    8/2011    .................... 362/263

Primary Examiner — Mary McManmon
Assistant Examiner — James Endo
(74) Attorney, Agent, or Firm — Neustel Law Offices

(57) ABSTRACT

A light filtering system for filtering light from a light source so as to conceal the light source's signature. The light filtering system generally includes an outer member and an inner member which are hingedly secured to each other. The outer member includes a filter insert having a plurality of apertures for filtering light and thus reducing light signature from a light source. The inner member, which is frictionally engaged with the light source, includes a protection insert to prevent damage to the light source when the present invention is installed thereon.

8 Claims, 7 Drawing Sheets

(56) References Cited

U.S. PATENT DOCUMENTS

| | | | |
|---|---|---|---|
| 7,824,062 B2* | 11/2010 | Ho | 362/188 |
| 7,969,673 B2* | 6/2011 | Hanna et al. | 359/894 |
| 8,157,407 B2* | 4/2012 | Palmer et al. | 362/197 |
| 2002/0085379 A1* | 7/2002 | Han et al. | 362/227 |
| 2002/0167731 A1* | 11/2002 | Watson | 359/611 |
| 2003/0133709 A1* | 7/2003 | Kobayashi et al. | 396/448 |
| 2008/0106906 A1* | 5/2008 | Lewsadder et al. | 362/322 |
| 2010/0033961 A1* | 2/2010 | Palmer et al. | 362/202 |
| 2010/0315821 A1 | 12/2010 | Weber | |
| 2012/0127710 A1* | 5/2012 | Jurik et al. | 362/235 |

* cited by examiner

LIGHT FILTERING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a filtering system and more specifically it relates to a light filtering system for filtering light from a light source so as to conceal the light source's signature.

2. Description of the Related Art

Any discussion of the related art throughout the specification should in no way be considered as an admission that such related art is widely known or forms part of common general knowledge in the field.

When utilizing a light source to provide light in various areas, it is often desirable to conceal the light source's signature so as to prevent easily detection of the source and location of the light. In the past, light filters have been narrowly adapted to change the light's color (i.e. to green, blue or red) to reduce the light's signature. However, such previously-existing systems have often suffered from limited effectiveness and still allow a large floodlight to be broadcast from the source, thus leaving a much larger signature angle.

Because of the inherent problems with the related art, there is a need for a new and improved light filtering system for filtering light from a light source so as to conceal the light source's signature.

BRIEF SUMMARY OF THE INVENTION

The invention generally relates to a light filtering system which includes an outer member and an inner member which are hingedly secured to each other. The outer member includes a filter insert having a plurality of apertures for filtering light and thus reducing light signature from a light source. The inner member, which is frictionally engaged with the light source, includes a protection insert to prevent damage to the light source when the present invention is installed thereon.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
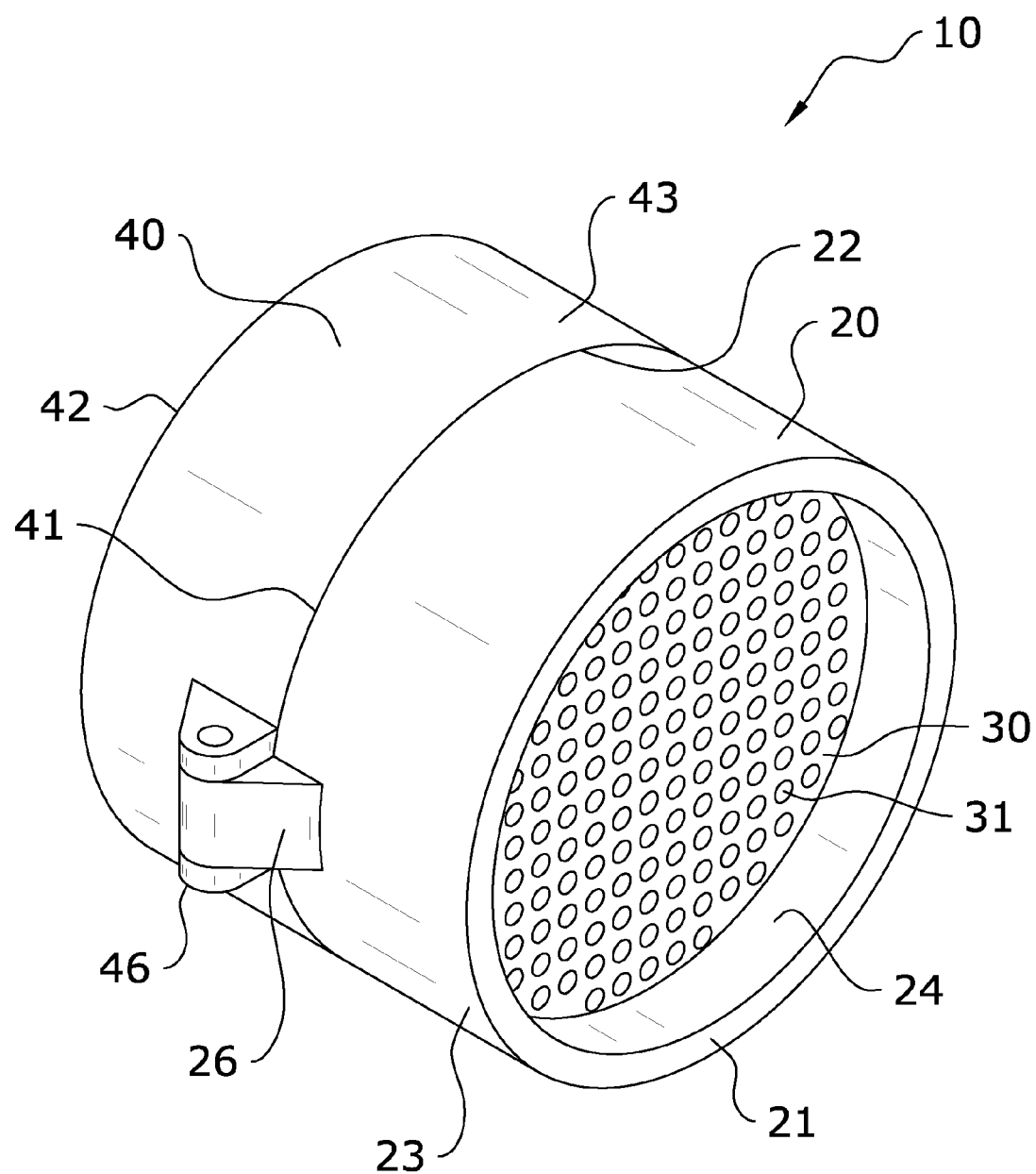
FIG. 1 is a frontal upper perspective view of the present invention.

Turning now descriptively to the drawings, in which similar reference characters denote similar elements throughout the several views, FIGS. 1 through 9 illustrate a light filtering system 10 for attachment to a light source 12, which comprises an outer member 20 and an inner member 40 which are hingedly secured to each other. The outer member 20 includes a filter insert 30 having a plurality of apertures 31 for filtering light and thus reducing light signature from a light source 12 such as a flashlight as shown throughout the figures. The inner member 40, which is frictionally engaged with the light source 12, includes a protection insert 50 to prevent damage to the light source 12 when the present invention is installed thereon.

It is important to note at the outset that the present invention is adapted for use with a wide range of light sources 12. Thus, the present invention should not be construed as being limited to any particular light source 12 configuration, shape or size. The present invention may be utilized with light source's 12 as small as a pen-light and as large as a floodlight. The figures herein are merely for illustrative purposes, and are not intended to be in any way limiting on the type of light source 12 the present invention is adapted for use with.

B. Outer Member

As shown in FIG. 1, the present invention includes an outer member 20 which includes a filter insert 30 and is hingedly secured to the inner member 40. The outer member 20 may be comprised of various configurations, but will preferably be comprised of a ring member as shown in the figures having an outer edge 23 and an inner edge 24. The outer member 20 will generally be comprised of the same cross-section as the light source 12 to which the present invention is being secured.

The rear end 22 of the outer member 20 is hingedly secured to the front end 41 of the inner member 40. The front end 21 of the outer member 20 faces outwardly from the light source 12 as shown in FIG. 1.

Figure 4:
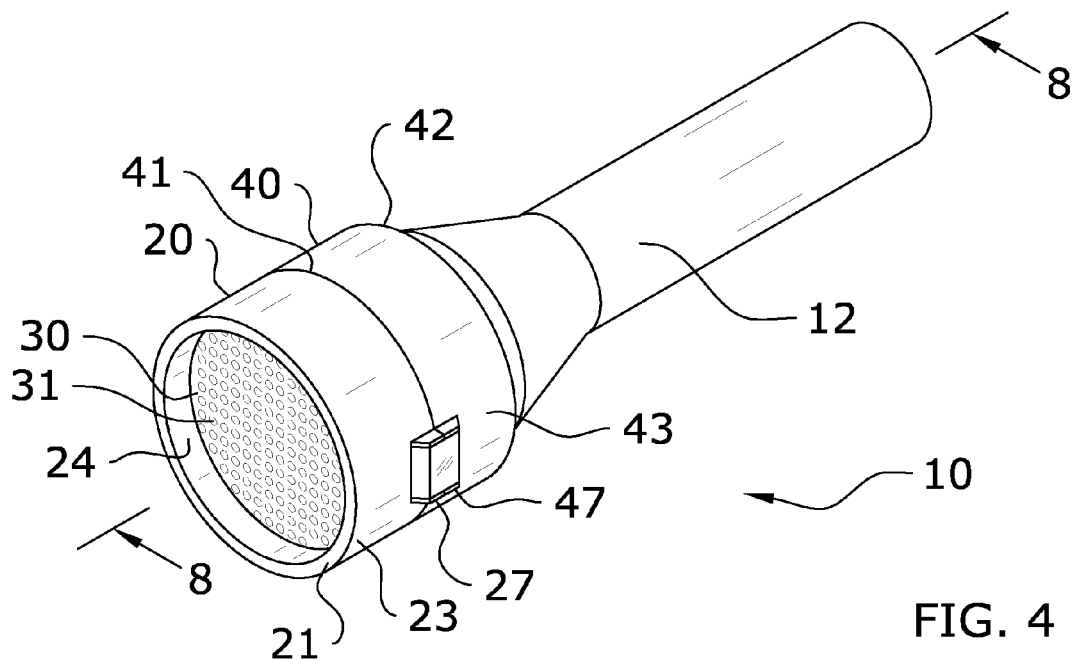
FIG. 4 is an upper perspective view of the present invention attached to a light source.
Figure 5:
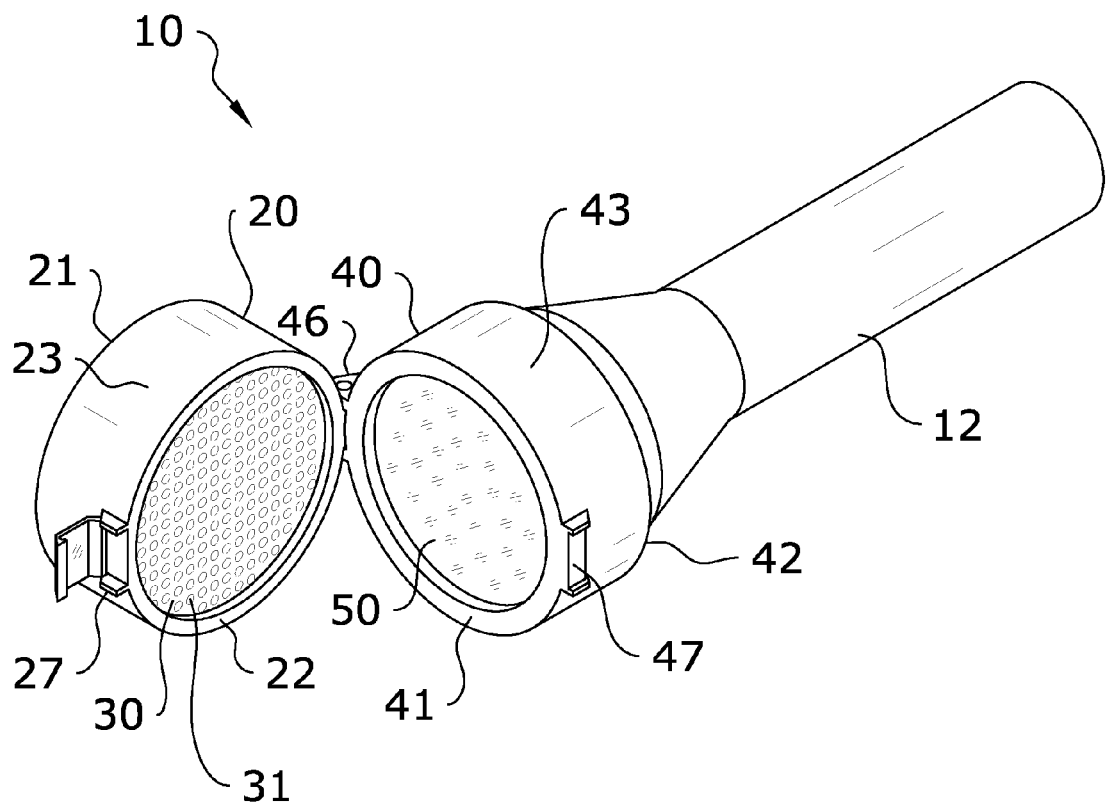
FIG. 5 is an upper perspective view of the present invention attached to a light source in an opened state.
Figure 6:
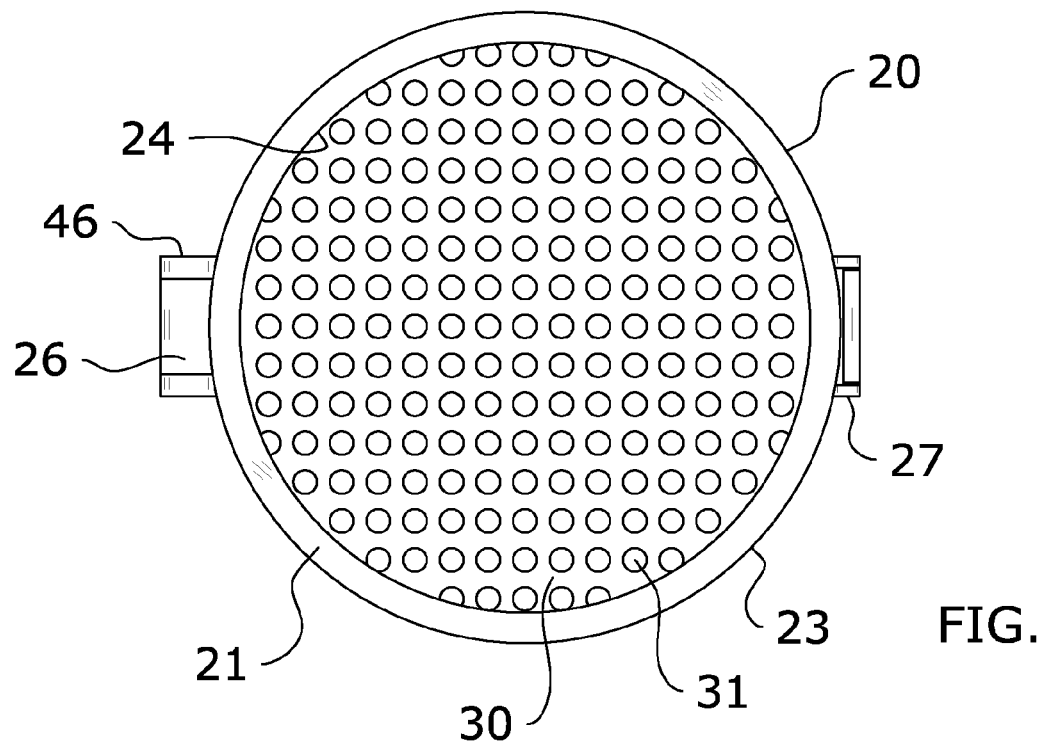
FIG. 6 is a front view of the present invention.
Figure 7:
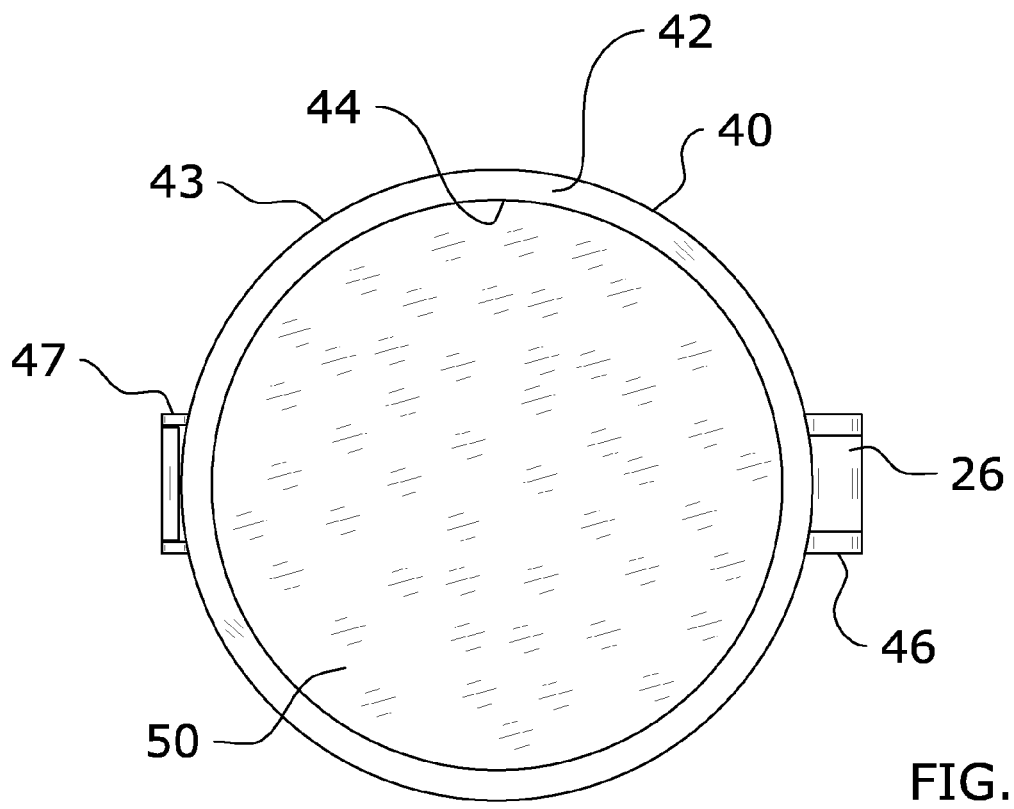
FIG. 7 is a rear view of the present invention.
Figure 8:
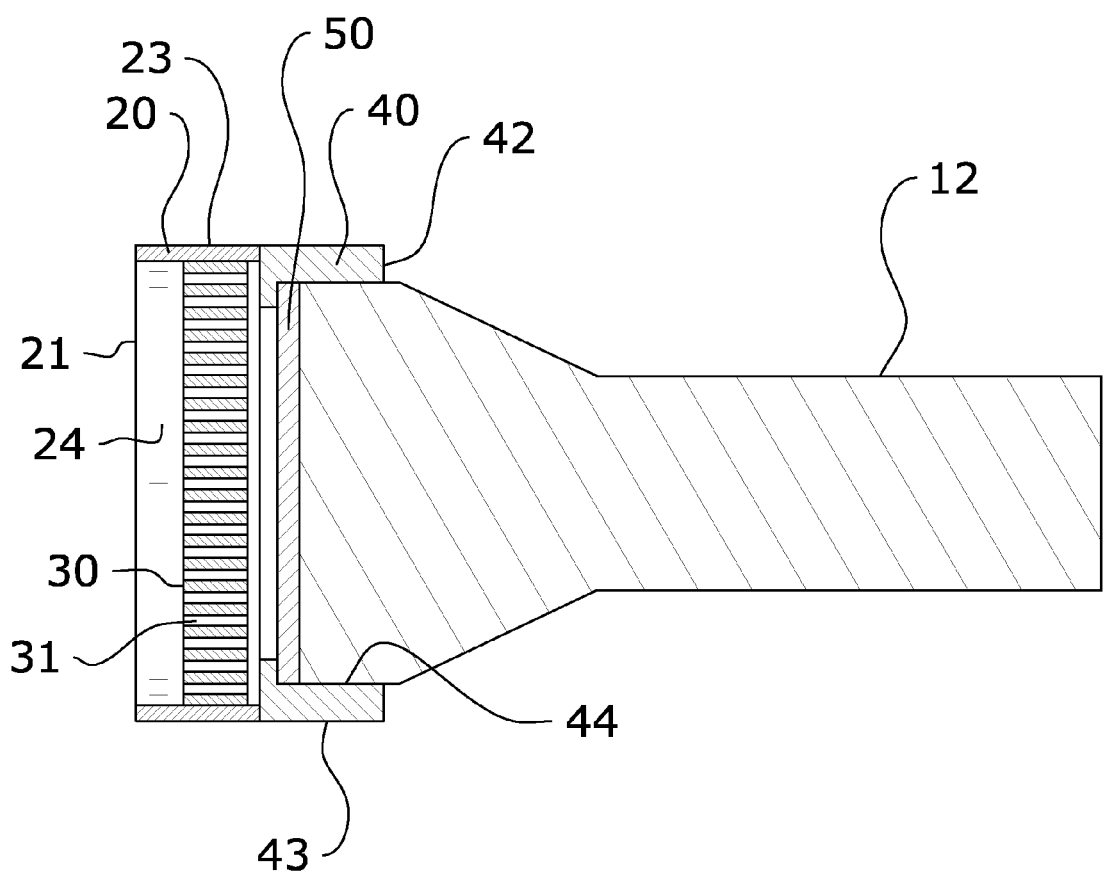
FIG. 8 is a side sectional view of the present invention.
Figure 9:
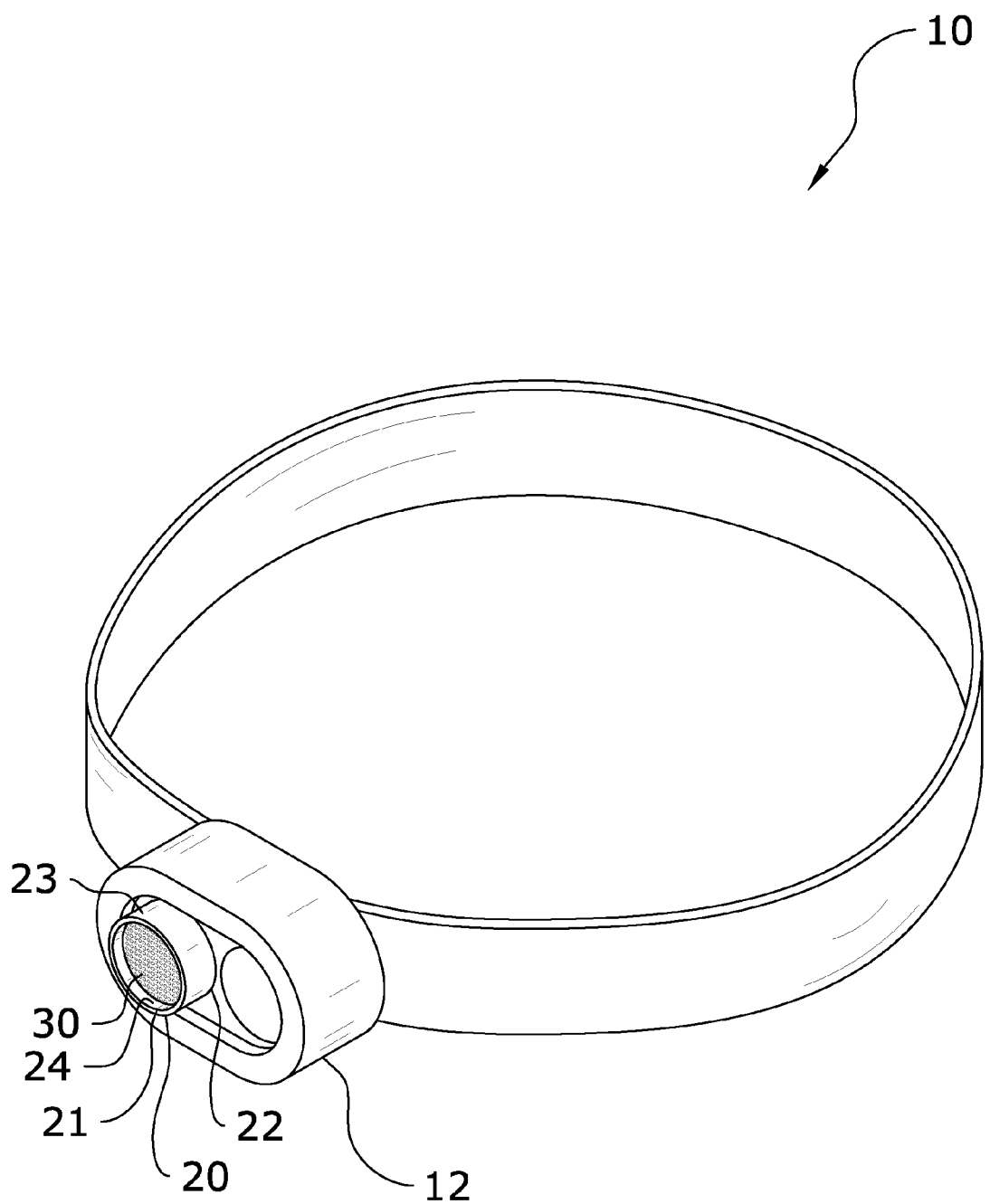
FIG. 9 is an upper perspective view of the present invention installed on an alternate light source.

The outer member 20 will generally include a linkage member 26 comprised of a tab or similar structure which is secured at one end to the outer edge 23 of the outer member 20 and at the other end to the hinge member 46 of the inner member 40. The outer member 20 also includes a first locking member 27 positioned on its outer edge 23 which lockingly engages with a corresponding second locking member 47 positioned on the outer edge 43 of the inner member 40 to lock the inner and outer members 20, 40 in a closed position as shown in FIG. 1. By releasing the locking members 27, 47, the inner and outer members 20, 40 may be hingedly moved into an open position as shown in FIG. 4.

The outer member 20 includes a filter insert 30 secured within its inner edge 24 as shown in FIG. 1. The filter insert 30 may be positioned at any location along the inner edge 24 of the outer member 20 between its front and rear ends 21, 22. Preferably, the filter insert 30 will be positioned approximately halfway between the front and rear ends 21, 22 of the outer member 20 as shown in the figures.

The filter insert 30 is preferably comprised of a disc-shaped configuration with a cross-section matching that of the outer member 20. The filter insert 30 may be fixedly secured within the inner edge 24 of the outer member 20 or removably secured therein, depending on the embodiment. The filter insert 30 may be frictionally engaged within the outer member 20 or may be attached by groove, hinges, cam locks, screws or other means.

The filter insert 30 includes a plurality of apertures 31 for filtering light from the light source 12. The shape, positioning and number of apertures 31 may vary for different applications. The filter insert 30 may also be comprised of different colors in some embodiments. By way of example and without limitation, the apertures 31 could be comprised of such shapes and configurations as honeycomb, square, octagonal, diamond and the like.

C. Inner Member

Figure 2:
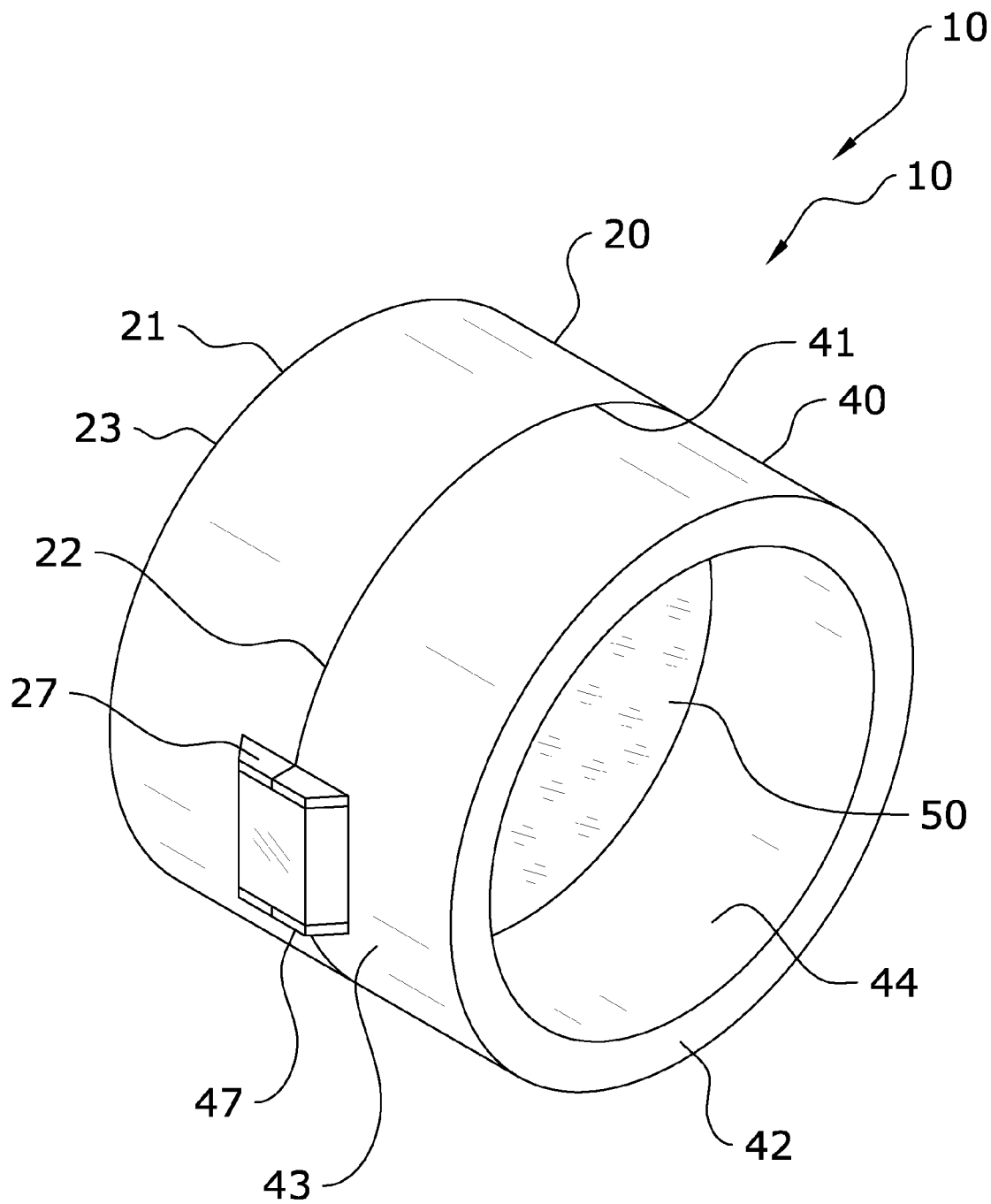
FIG. 2 is a rear upper perspective view of the present invention.
Figure 3:
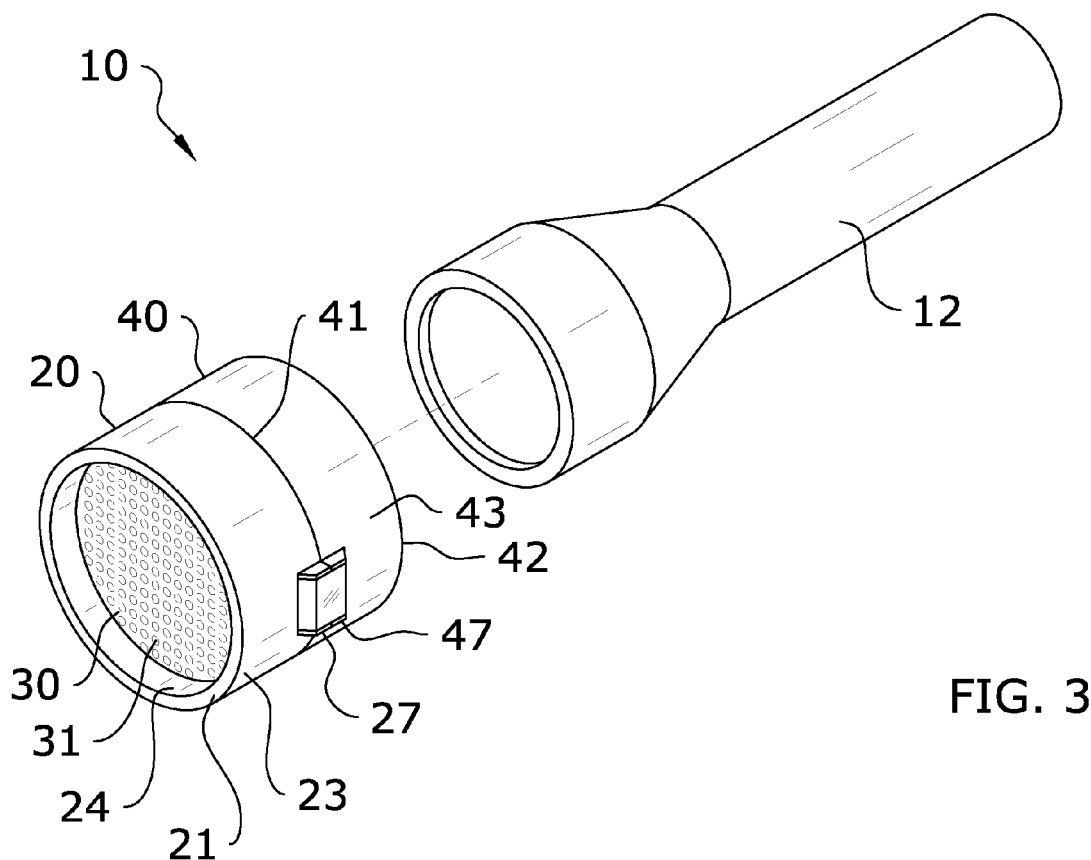
FIG. 3 is an upper perspective view illustrating attachment of the present invention to a light source.

As shown in FIG. 2, the present invention includes an inner member 40 which is removably and frictionally connected to a light source 12. The inner member 40 may be comprised of various configurations, but will preferably be comprised of a ring member as shown in the figures having an outer edge 43 and an inner edge 44. The inner member 40 will generally be comprised of the same cross-section as the outer member 20.

The front end 41 of the inner member 40 is hingedly secured to the rear end 22 of the outer member 20. The rear end 42 of the inner member 40 is generally frictionally engaged with the light source 12. Thus, the diameter or width of the inner member 40 will preferably be only slightly larger than the diameter or width of the light source 12 to which the present invention is being attached so as to allow a tight, frictional engagement while retaining removability.

The inner member 40 will generally include a hinge member 46 which is secured at one end to the outer edge 43 of the inner member 40 and at the other end to the linkage member 26 of the outer member 20. The inner member 40 also includes a second locking member 47 positioned on its outer edge 43 which lockingly engages with a corresponding first locking member 27 positioned on the outer edge 23 of the outer member 20 to lock the inner and outer members 20, 40 in a closed position as shown in FIG. 1. By releasing the locking members 27, 47, the inner and outer members 20, 40 may be hingedly moved into an open position as shown in FIG. 4.

The inner member 40 may also include a protection insert 50 comprised of a transparent, substantially rigid material such as a lens protector. The protection insert 50 is positioned within the inner edge 44 of the inner member 40 to protect the light source 12 from damage or becoming dirty while the present invention is in use.

The protection insert 50 may be positioned at any location along the inner edge 44 of the inner member 40 between its front and rear ends 41, 42. Preferably, the protection insert 50 will be positioned approximately halfway between the front and rear ends 41, 42 of the inner member 40 as shown in the figures.

The protection insert 50 is preferably comprised of a disc-shaped configuration with a cross-section matching that of the inner member 40. The protection insert 50 may be fixedly secured within the inner edge 44 of the inner member 40 or removably secured therein, depending on the embodiment. The protection insert 50 may be frictionally engaged within the inner member 40 or may be attached by groove, hinges, cam locks, screws or other means.

D. Operation of Preferred Embodiment

In use, inner member 40 is frictionally engaged and installed on the end of the light source 12. By swinging the outer member 20 into a closed position using the hinge member 46 and locking members 27, 47, the filter insert 30 is positioned over the light source 12 to filter the light exiting therefrom. When needed, the outer member 20 may be swung into an open position to allow the light source 12 to emit light without filtering.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A light filtering system, comprising:
   an inner member, wherein said inner member includes a front end and a rear end, wherein said rear end of said inner member is removably secured to a light source;
   an outer member, wherein said outer member includes a front end and a rear end, wherein said rear end of said outer member is hingedly secured to said front end of said inner member;
   a hinge member secured to an outer edge of said inner member;
   a securing member secured to an outer edge of said outer member, wherein said securing member is connected to said hinge member;
   a first locking member secured to an outer edge of said outer member;
   a second locking member secured to an outer edge of said inner member;
   a protection insert positioned within an inner edge of said inner member, wherein said protection insert comprises a top planar surface and a bottom planar surface, wherein said protection insert is transparent, and wherein said protection insert is positioned halfway between a front end of said inner member and a rear end of said inner member; and
   a filter insert removably positioned within said outer member, wherein said filter insert includes a plurality of apertures, wherein said filter insert is adapted to be selectively positioned over said protection insert.

2. The light filtering system of claim 1, wherein said inner member is comprised of a ring member.

3. The light filtering system of claim 1, wherein said outer member is comprised of a ring member.

4. The light filtering system of claim 1, wherein said filter insert is removably positioned within said outer member.

5. The light filtering system of claim 1, wherein said inner member is comprised of a circular cross-section.

6. The light filtering system of claim 1, wherein said outer member is comprised of a circular cross-section.

7. A light filtering system, comprising:
   a light source;
   an inner member, wherein said inner member includes a front end and a rear end, wherein said rear end of said inner member is removably secured to said light source;
   an outer member, wherein said outer member includes a front end and a rear end, wherein said rear end of said outer member is hingedly secured to said front end of said inner member;
   a hinge member secured to an outer edge of said inner member;
   a securing member secured to an outer edge of said outer member, wherein said securing member is connected to said hinge member;
   a first locking member secured to an outer edge of said outer member;
   a second locking member secured to an outer edge of said inner member;
   a protection insert positioned within an inner edge of said inner member, wherein said protection insert comprises a top planar surface and a bottom planar surface, wherein said protection insert is transparent, and wherein said protection insert is positioned halfway between a front end of said inner member and a rear end of said inner member; and
   a filter insert removably positioned within said outer member, wherein said filter insert includes a plurality of apertures, wherein said filter insert is adapted to be selectively positioned over said protection insert.

8. The light filtering system of claim 7, wherein said light source is comprised of a flashlight.

* * * * *